United States Patent
Seigneurbieux et al.

(10) Patent No.: US 9,491,494 B2
(45) Date of Patent: Nov. 8, 2016

(54) DISTRIBUTION AND USE OF VIDEO STATISTICS FOR CLOUD-BASED VIDEO ENCODING

(71) Applicant: Google Technology Holdings LLC, Mountain View, CA (US)

(72) Inventors: Pierre Seigneurbieux, Fremont, CA (US); Shivkumar Jayaraman, Cupertino, CA (US); Wayne D. Michelsen, Menlo Park, CA (US); Fabrice Quinard, Los Gatos, CA (US); Shiv Saxena, Portland, OR (US); Venkatram Vajjhula, Fremont, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 359 days.

(21) Appl. No.: 13/623,543

(22) Filed: Sep. 20, 2012

(65) Prior Publication Data

US 2014/0078401 A1    Mar. 20, 2014

(51) Int. Cl.
  *H04N 7/16* (2011.01)
  *H04N 9/74* (2006.01)
  *H04N 5/00* (2011.01)
  *H04N 21/222* (2011.01)
  (Continued)

(52) U.S. Cl.
  CPC ........ *H04N 21/222* (2013.01); *H04N 21/2353* (2013.01); *H04N 21/23418* (2013.01); *H04N 21/23614* (2013.01); *H04N 21/26603* (2013.01); *H04N 21/64784* (2013.01)

(58) Field of Classification Search
  CPC .................. H04N 21/23418; H04N 21/23614
  See application file for complete search history.

(56) References Cited

U.S. PATENT DOCUMENTS 8,069,142 B2   11/2011  Davis et al.
8,090,861 B2    1/2012  Miller et al.
(Continued)

FOREIGN PATENT DOCUMENTS

WO    2012027891 A1    3/2012

OTHER PUBLICATIONS

Xiaohui Gu et al.: Spidernet: an integrated peer-to-peer service compsition framework, High Performance Distributed Computing, 20004, Proceedings. 13th IEEE International Symposium on Onolulu, HI, USA Jun. 4-6, 2004, Piscataway, NJ, USA, IEEE, Jun. 4, 2004, pp. 110-119.

(Continued)

*Primary Examiner* — Kyu Chae
(74) *Attorney, Agent, or Firm* — Byrne Poh LLP

(57) ABSTRACT

A method for processing a video stream includes receiving first and second copies of the video stream by first and second video processing devices, respectively, and generating first and second statistical data for the video stream by the first and the second video processing devices, respectively. The method further includes transmitting in first and second transmissions the first and the second copies of the video stream with the first and the second statistical data respectively from the first and the second video processing device to a third video processing device, and reading the first and the second statistical data from the first and the second transmissions by the third video processing device. The method further includes combining the first and the second statistical data with one copy of the video stream by the third video processing device, and transmitting the one copy of the video stream with the first and the second statistical data.

9 Claims, 5 Drawing Sheets

(51) Int. Cl.
*H04N 21/234* (2011.01)
*H04N 21/235* (2011.01)
*H04N 21/236* (2011.01)
*H04N 21/266* (2011.01)
*H04N 21/647* (2011.01)

(56) References Cited

U.S. PATENT DOCUMENTS

| | | | |
|---|---|---|---|
| 8,091,089 | B2 | 1/2012 | Choi et al. |
| 2002/0094031 | A1* | 7/2002 | Ngai et al. ............... 375/240.27 |
| 2003/0012275 | A1* | 1/2003 | Boice et al. ............. 375/240.01 |
| 2006/0200251 | A1 | 9/2006 | Gu et al. |
| 2007/0061862 | A1* | 3/2007 | Berger et al. ................. 725/139 |
| 2007/0140335 | A1 | 6/2007 | Wilinski et al. |
| 2008/0013620 | A1 | 1/2008 | Hannuksela et al. |
| 2011/0299604 | A1* | 12/2011 | Price et al. ............... 375/240.26 |
| 2012/0147958 | A1* | 6/2012 | Ronca et al. ............ 375/240.16 |
| 2014/0036073 | A1* | 2/2014 | Black ....................... H04N 7/18 348/143 |

OTHER PUBLICATIONS

Chris Poppe et al: "Semantic web technologies for video surveillance metadata", Multimedia Tools and Applications, Kluwer Academic Publishers, 80, vo. 56, No. 3, Sep. 14, 2010, pp. 439-467.
Patent Cooperation Treaty, International Search Report and Written Opinion of the International Searching Authority for International Application No. PCT/US2013/060048, Dec. 12, 2013, 11 pages.

* cited by examiner

DISTRIBUTION AND USE OF VIDEO STATISTICS FOR CLOUD-BASED VIDEO ENCODING

BACKGROUND

Video processing systems include a number of processing modules for processing and encoding video prior to the video being supplied to media devices for consumption. A video processing system's may include a number of video processing devices that provide multiple processing steps for video preprocessing, video encoding, video transcoding, video compression, etc.

A number of video processing devices in such systems generate statistical data for processing video. For example, video processing devices, such as encoders, generate statistical data for face recognition, logo detection, motion vector mapping, etc. Generating statistical data for processing video are derived from complex algorithms that consume a large amount of processing power of a video processing device.

The video processing devices in a video processing system often use the same, or substantially similar statistical data, for processing video, however the video processing devices do not share the statistical data after the statistical data is generated. Therefore, each video processing device that uses the same statistical data or substantially similar statistical data generates the statistical data for use. Regenerating statistical data is a waste of precious computation resources. Moreover, each video processing device that generates and uses statistical data is substantially sophisticated and therefore, relatively costly.

SUMMARY

According to one embodiment, a method for processing a video stream includes receiving first and second copies of the video stream by first and second video processing devices, respectively, and processing the first and the second copies of the video stream to generate first and second statistical data for the video stream by the first and the second video processing devices, respectively. The method further includes transmitting in first and second transmissions the first and the second copies of the video stream with the first and the second statistical data respectively from the first and the second video processing device to a third video processing device, and reading the first and the second statistical data from the first and the second transmissions by the third video processing device. The method further includes combining the first and the second statistical data with one copy of the video stream by the third video processing device, and transmitting the one copy of the video stream with the first and the second statistical data.

According to another embodiment, a method for processing a video stream includes receiving the video stream by a first video processing device, and generating first statistical data for the video stream by the first video processing device. The method further includes transmitting in a first transmission the video stream with the first statistical data to a second video processing device from the first video processing device, and generating second statistical data for the video stream by the second video processing device. The method further includes combining the first and the second statistical data for the video stream by the second video processing device, and transmitting in a second transmission the video stream with the first and the second statistical data combined from the second video processing device.

According to another embodiment, method for processing a video stream includes receiving the video stream at a first video processing device, wherein the video stream includes first statistical data for the video stream, and generating second statistical data for the video stream by the first video processing device. The method further includes combining the first and the second statistical data for the video stream by the first video processing device, and transmitting in a transmission the video stream with the first and the second statistical data to a second video processing device from the first video processing device.

According to another embodiment, a video processing device for synchronously processing a video stream includes a command-data embedder for: receiving the video stream, wherein the video stream includes first statistical data for the video stream, combining the first statistical data with second statistical data for the video stream, and transmitting in a transmission the video stream with the first and the second statistical data from the video processing device. The video processing device further includes a statistical data generator for generating the second statistical data for the video stream.

The following detailed description and accompanying drawings provide a more detailed understanding of the nature and advantages of the present invention.

DETAILED DESCRIPTION

Described herein are techniques sharing statistical data among video processing devices that compose a video processing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
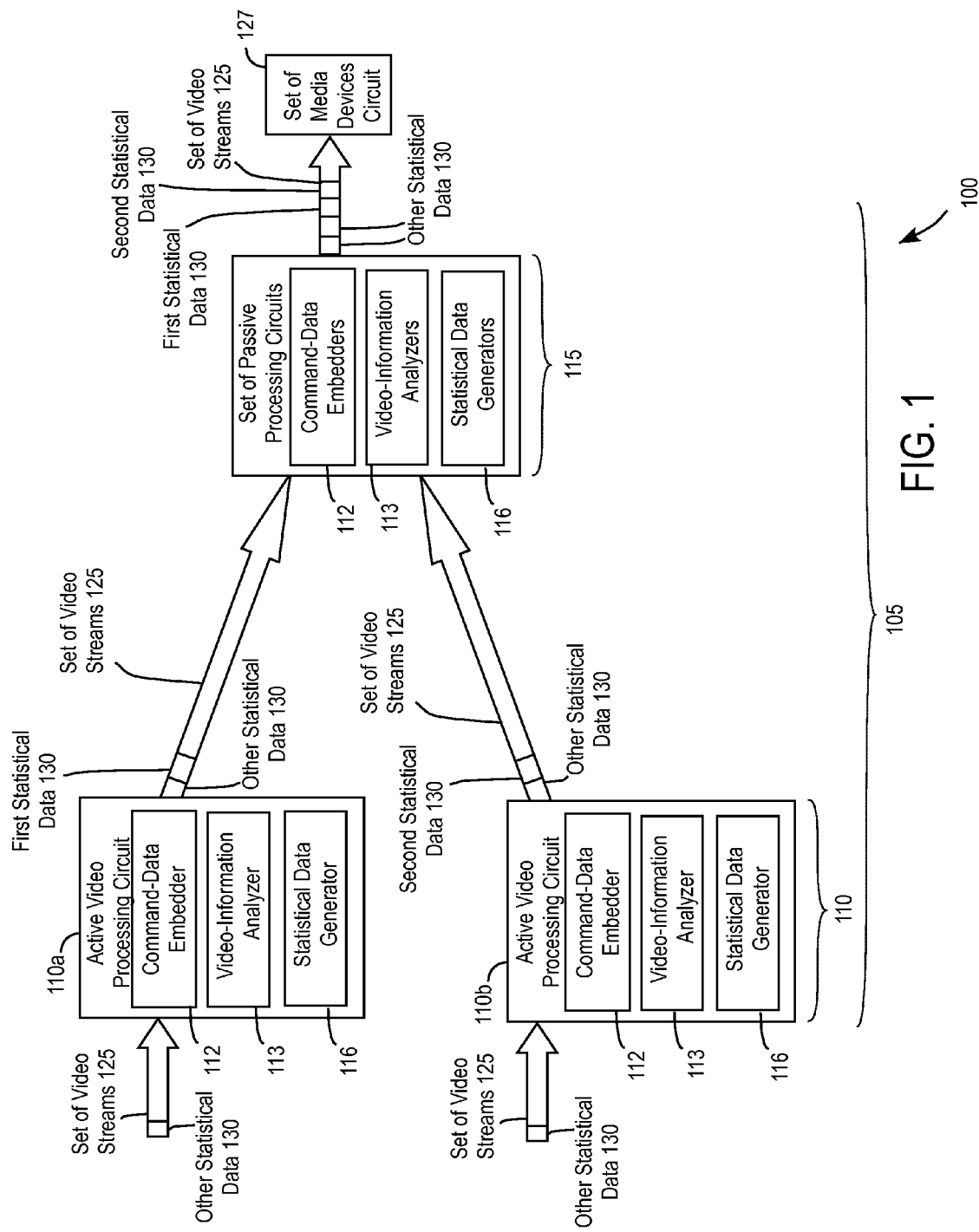
FIG. 1 depicts a video processing system according to one embodiment.

FIG. 1 depicts a video processing system 100 according to one embodiment. Video processing system 100 process a set of video streams 125 of a video for consumption of the video streams by a set of media devices 127. The set of video streams may be for the same video, such as a movie, a television show, or the like.

Video processing system 100 may be at a headend or at an intermediate node in a network between a headend and the set of media devices 127, which consume the set of video streams 125 processed by the video processing system. An intermediate node that includes video processing system 100 may be in the "last mile" of video distribution to the set of media devices 127. Video processing system 100 may alternatively be a distributed system where various portions of the video processing system reside at a headend, other portions reside at intermediate nodes, and/or still other portions reside in the set of media devices 127. The headend and intermediate nodes are sometimes referred to as the "cloud."

According to one embodiment, video processing system 100 includes a set of video processing devices 105 that process the set of video streams 125 where the video streams are in different formats. A set as referred to herein may include one or more elements. The different formats of video streams 125 may have different resolutions, bit rates, etc. Video processing devices 105 may be circuit devices, such as integrated circuits.

According to one embodiment, the set of video processing devices 105 includes a set of active video processing devices 110 and a set of passive video processing devices 115. Video processing devices may be different computing devices or be part of the same computing device. As shown in FIG. 1, the set of active video processing devices 110 are upstream from the set of passive video processing device 115. That is, active video processing devices 110 process video streams 125 before passive video processing device 115. Additionally, active video processing devices 110 may be separate from passive video processing device 115 in a cloud-based architecture. As further shown in FIG. 1, active video processing devices in the set of active video processing devices 110 are in parallel and may parallel process the set of video streams 125.

Figure 2:
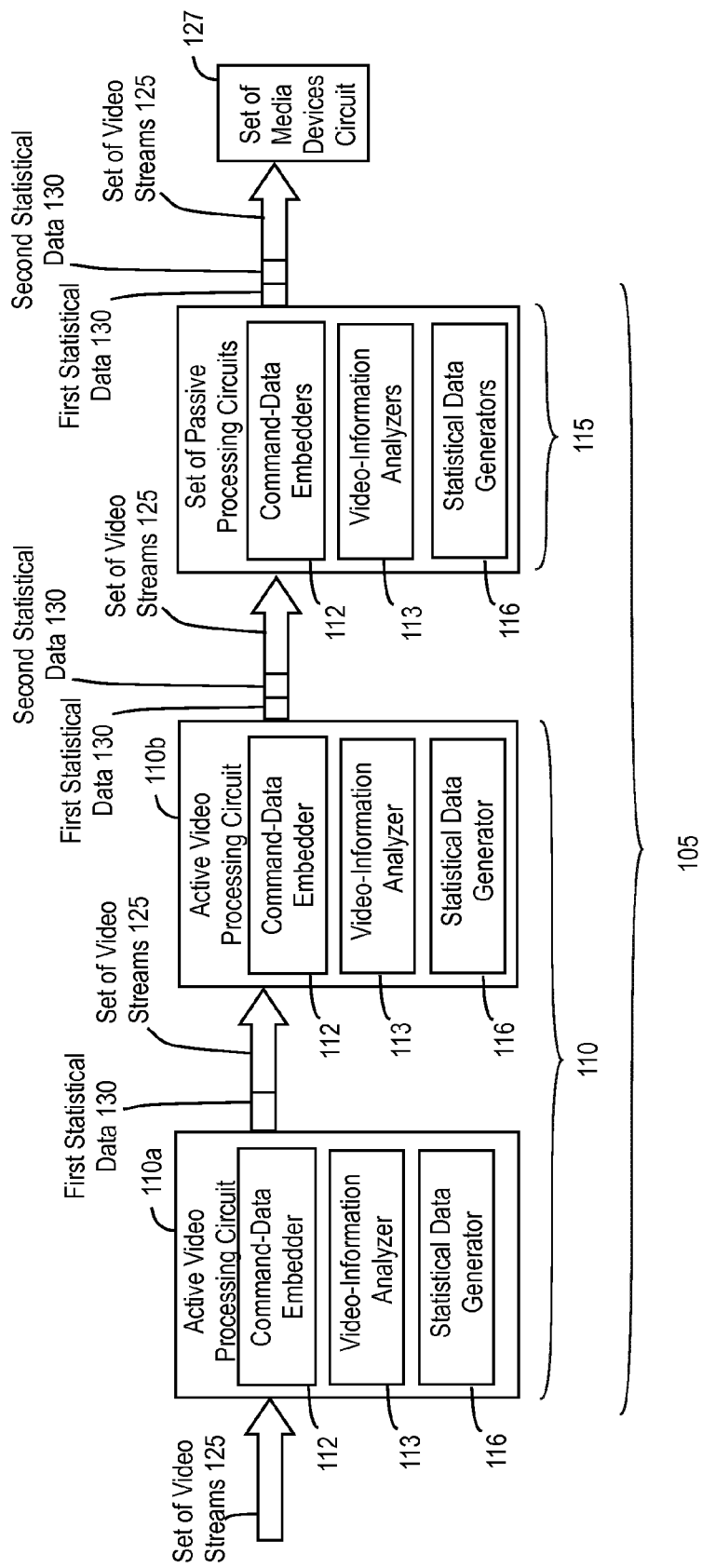
FIG. 2 depicts a video processing system according to one embodiment.

FIG. 2 depicts another embodiment of video processing system 100 where active video processing devices 110 are serially disposed with respect to one another and may serially process the set of video streams 125. Similar to the embodiment of video processing system 100 shown in FIG. 1, the embodiment of video processing system 100 shown in FIG. 2 includes the set of active video processing devices 110 being upstream from the set of passive video processing device 115. While FIGS. 1 and 2 show the set of active video processing devices 110 upstream from the set of passive video processing device 115, the active video processing devices and the passive video processing devices may be alternatively disposed according to alternative embodiments. For example, active video processing devices 110 may be up stream and/or downstream from passive video processing devices 115. Further, passive video processing devices 115 may be disposed in parallel and/or in series. Each video processing device 105 that is upstream from another video processing device 105 may transmit the set of video streams 125 to the another video processing device 105 subsequent to processing the set of video streams 125.

The set of active video processing devices 110 and the set of passive video processing devices 115 may include pre-processors, encoders, transcoders, the set of media device 127, etc. According to one embodiment, each active video processing device 110 includes a statistical data generator 116 that analyzes video and generates statistical data 130 for at least one of video streams 125 that is received by the active video processing device. Statistical data generator 116 may generate statistical data as a video stream is analyzed. Statistical data 130 generated for video processing may include: picture activity data, picture complexity data, scene change detection data, fade detection data, logo location data, face detection data, face location data, motion vector maps, repeat picture detection data, targeted bitrate data for a video stream on a codec basis, key frame identification data for splicing, etc.

According to another embodiment, one or more video processing devices 105 may receive and use statistical data 130 generated by one or more of active video processing devices 110. That is, active video processing devices 110 may share statistical data 130 that the active video processing devices receive, and/or generate, with other video processing device 105. Passive video processing devices 115 may generate statistical data 130 for use in processing video, but the passive video processing device may not share the statistical data that the passive video processing devices generate with other video processing devices 105 according to one embodiment. However, passive video processing devices 115 may share statistical data 130 that is received and that is generated by active video processing devices 110 with other video processing devices 105. Video processing devices 105 that generate statistical data 130 may be upstream from other video processing devices 105 that receive the statistical data from the video processing devices 105 that are upstream. Therefore, video processing devices 105 that are downstream and receive statistical data 130 from video processing devices 105 that are upstream do not need to regenerate statistical data 130 received. Because video processing devices 105 that are downstream do not need to regenerate statistical data 130 received, video processing devices 105 that are downstream may be relatively less sophisticated than the video processing devices that are upstream and may be relatively low cost.

Each active video processing device 110 is configured to transmit (i.e., share) statistical data 130 that the active video processing device generates to one or more video processing devices 105 downstream from the active video processing device. Statistical data 130 may be transmitted in-band in the set of video stream 125 or out of band with respect to the set of video streams 125. Statistical data 130 transmitted in-band may be in in-band portions of video streams 125 where each video frame is adjacent to an in-band portion. Statistical data 130 may be transmitted out of band in a video elementary stream under a user private data portion of the set of video streams 125. Video elementary streams and user private data are portions of a video stream specified by various MPEG standards, such as the MPEG2 standard. Statistical data 130 may also be transmitted out of band in packet identifiers (PID) of network packets, such as TCP/IP packets. Statistical data 130 may be transmitted in adaption fields (AFs) in the transport packet layer of a network, such as the Internet, an intranet, or the like. While the foregoing describe locations in which statistical data 130 may be transmitted from one video processing device 105 downstream to another video processing device 105, statistical data 130 may be transmitted between video processing devices 105 by a variety of other schema. Statistical data 130 in in-band portions of video or out of band may be arranged in headers, payloads, etc. where header information in a header may identify statistical data 130 as statistical data (as compared to other types of data).

Each video processing device 105 may receive statistical data 130 with the set of video streams 125. For example, FIG. 2 shows the set of active video processing devices 110 receives statistical data 130 with the set of video streams 125 that the set of active video processing device 110 receives. FIG. 2 further shows the set of passive video processing devices 115 also receives statistical data 130 with the set of video streams 125 that the set of passive video processing devices 115 receives.

According to one embodiment, each active video processing device 110 may: i) remove statistical data 130 from the set of video streams 125 received by active video processing device 110, ii) modify statistical data 130 in the set of video stream 125 received by active video processing device 110, iii) add new statistical data 130 to already existing statistical data 130 in the set of video streams 125 received by active video processing device 110, iv) leave the statistical data unchanged in the set of video streams 125, and/or v) use the statistical data for video processing. Statistical data 130 received by the set of active video processing device 110 that is: modified, added to, or unchanged, may be transmitted from the set of active video processing device 110 downstream to other video processing devices 105 where the other video processing devices 105 may use statistical data 130 for video processing or may further transmit statistical data 130 downstream.

According to another embodiment, each passive video processing device 115 may: i) use statistical data 130 received by the passive video processing device for processing the set of video streams 125, ii) transmit downstream statistical data 130, and/or iii) may combine two or more sets of statistical data 130 received from two or more other video processing devices 105 into one set of statistical data 130 and pass downstream the one set of statistical data with the set of video streams 125. For example, FIG. 2 shows one passive video processing device 115 receiving two different set of statistical data 130 from two different active video processing devices 110, and combining the two different sets of statistical data 130 into one set of statistical data 130 that is transmitted downstream from passive video processing device 115. The two sets of statistical data 130 are unchanged other than being combined into one set of statistical data 130.

According to one embodiment, each video processing device 105 includes a command-data embedder 112. Each command-data embedder 112 may insert statistical data 130 into in-band portions of the set of video streams 125 or out of band with respect to the set of video streams 125. Each command-data embedder 112 may also read statistical data 130 from the in-band portions of the set of video steams 125 or from out of band.

Each command-data embedders 112 may recognize statistical data 130 in in-band portions of the set of video streams 125 and out of band via headers, via specific bit locations of the statistical data, etc. Command-data embedders 112 may have prior knowledge of the specific bit locations of where statistical data 130 may be in-band and out of band and analyze the specific bits locations to determine whether statistical data 130 is at the specific bit locations.

Each command-data embedder 112 may transmit downstream statistical data 130 received by the command-data embedder in each video stream 125. That is, any statistical data 130 that is modified, added to, or left unchanged by a given video processing device 105 may be transmitted downstream by the given video processing device. Statistical data 130 transmitted downstream by a command-data embedder 112 may be used by subsequent video processing devices 105 for video processing. For example, a selected passive video processing device 115 may receive the set of video streams 125 where one or more of the video streams includes statistical data 130. The command-data embedder 112 of the selected passive video processing device may read statistical data 130 from the in-band portions of the set of video streams 125 or from out of band, and use the statistical data for video processing. Thereafter, the selected passive video processing device may transmit downstream the statistical data in the same manner received (i.e., in-band or out of band).

Each command data embedder 112 in passive video processing devices 115 may combine two or more sets of statistical data 130 into a single set of statistical data 130 as described above. Video processing devices that do not include command-data embedders 112 described herein may not recognize statistical data 130 in in-band portions of the set of video streams 125 or out of band, and might not transmit the statistical data downstream. Therefore, video processing devices that lack command-data embedders may not allow downstream video processing devices to use the statistical data 130 because the statistical data is removed from the in-band portions of the set of video streams 125 and from out of band.

According to one embodiment, each command-data embedder 112 includes a video-information analyzer 113 that analyzes statistical data 130 read by the command-data embedder. Each video-information analyzer 113 may determine whether received statistical data 130 (or a portion of statistical data 130) is to be used by a selected video processing device 105 that includes the video-information analyzer that read the statistical data. If a selected video-information analyzer 113 determines that received statistical data 130 (or a portion of statistical data 130) is supposed to be used by a selected video processing device 105 that includes the selected video-information analyzer, the selected video-information analyzer may route statistical data 130 (or a portion of statistical data 130) to the appropriate devices of the selected video processing device for use to process video stream 125.

Figure 3:
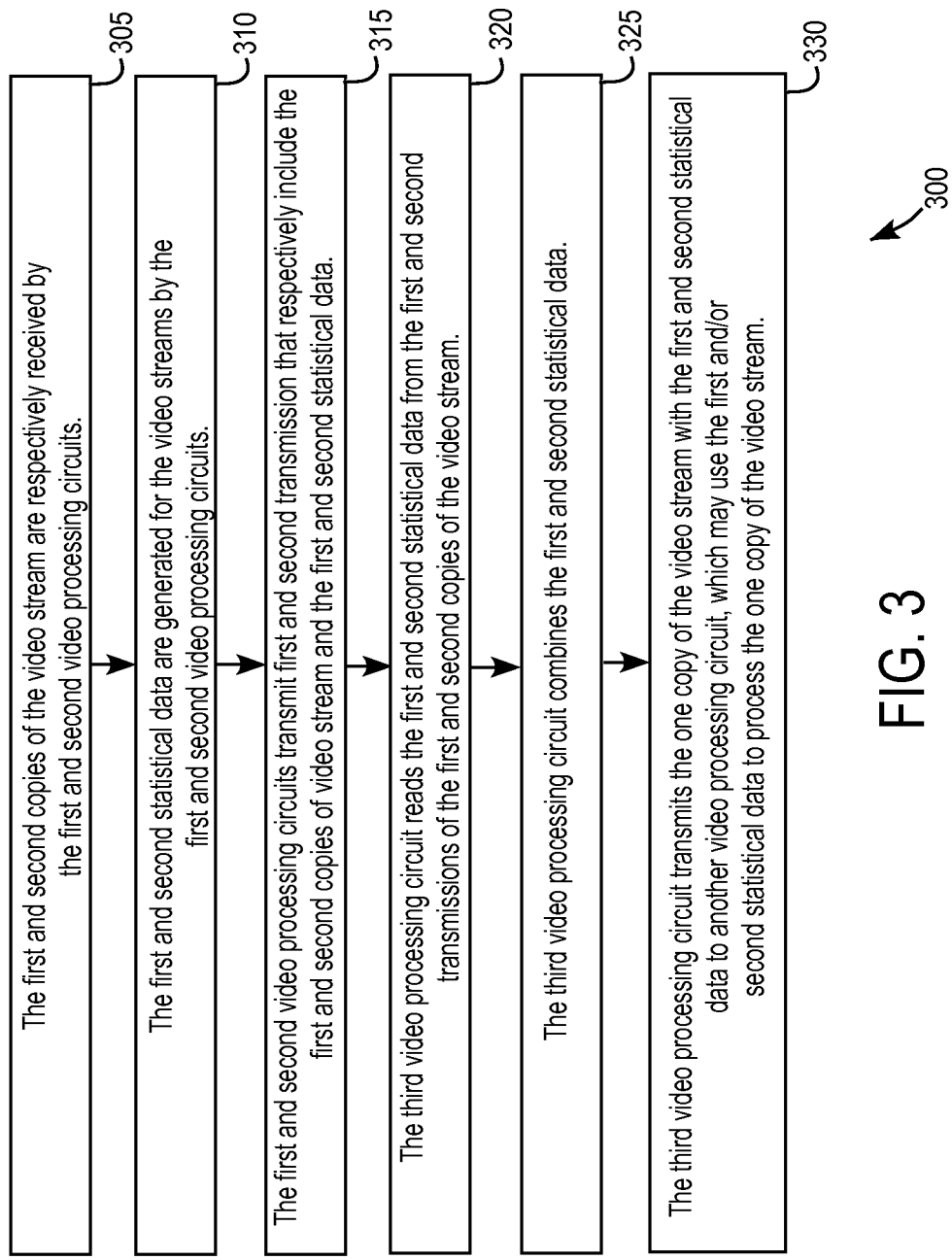
FIG. 3 depicts a high-level flow diagram of a video processing method according to one embodiment.

FIG. 3 depicts a high-level flow diagram of a video processing method 300 according to one embodiment. The high-level flow diagram represents one example embodiment and those of skill in the art will understand that various steps of the high-level flow diagram may be combined and/or added without deviating from the scope and the purview of the embodiment.

At 305, first and second copies of video stream 125 are respectively received by first and second video processing devices 105.

At 310, first and second statistical data 130 are generated for video streams 125 by first and second video processing devices 105, which respectively process the first and the second copies of video stream 125 to generate the first and the second statistical data. The first and second copies of video stream 125 may be raw video or compressed video where the compressed video may include other statistical data 130. First and second video processing devices 105 may be in parallel (as shown in FIG. 1) and may process the first and the second copies of video stream 125 in parallel.

At 315, first and second video processing devices 105 transmit first and second transmission that respectively include first and second copies of video stream 125 and first and second statistical data 130. The first and second statistical data 130 may be in in-band portions of the first and the second video streams, respectively. Alternatively, the first and the second statistical data 130 may be out of band with respect to the first and the second video streams, respectively. The first and second transmission may be directed to a third video processing device 105. Third video processing device 105 may be a passive video processing device 115.

At 320, third video processing device 105 reads (or otherwise extracts) first and second statistical data 130 from the first and the second transmissions of the first and the second copies of the video stream.

At 325, third video processing device 105 combines the first and the second statistical data 130. The combination of first and second statistical data 130 may be inserted into in-band portions of the one copy of the video stream, or may be out of band with respect to the one copy of the video stream.

At 330, third video processing device 105 transmits the one copy of the video stream with the first and the second statistical data to another video processing device 105, which may use the first and/or second statistical data to process the one copy of the video stream. Method 300 may be repeated iteratively as the first and the second copies of video stream 125 are received at 305 over a period of time.

The first and second video processing devices 105 described immediately above with respect to method 300 may be first and second active video processing devices 110, and may be at a headend or an intermediate node. The first and second active video processing devices 110 may be encoders configured to generate (i.e., encode) relatively computationally intensive statistical data (e.g., motion vector mapping data, logo detection data, etc.) for the first and the second copies of the video stream. By placing first and second active video processing devices 110 at a headend or an intermediate node to generate relatively computationally intensive statistical data, and by transmitting this statistical data downstream, numerous (e.g., tens, hundreds, thousands, etc.) downstream video processing devices 105 (e.g., including the third video processing device described above) may advantageously use first and second statistical data 130 without regenerating this statistical data. Because the numerous downstream video processing devices may not need to regenerate first and second statistical data 130, the numerous downstream video processing devices may be relatively less sophisticated than the first and the second active video processing devices 110 at the headend or intermediate node and may be relatively less expensive than the first and the second active video processing devices at the headend or intermediate node.

Figure 4:
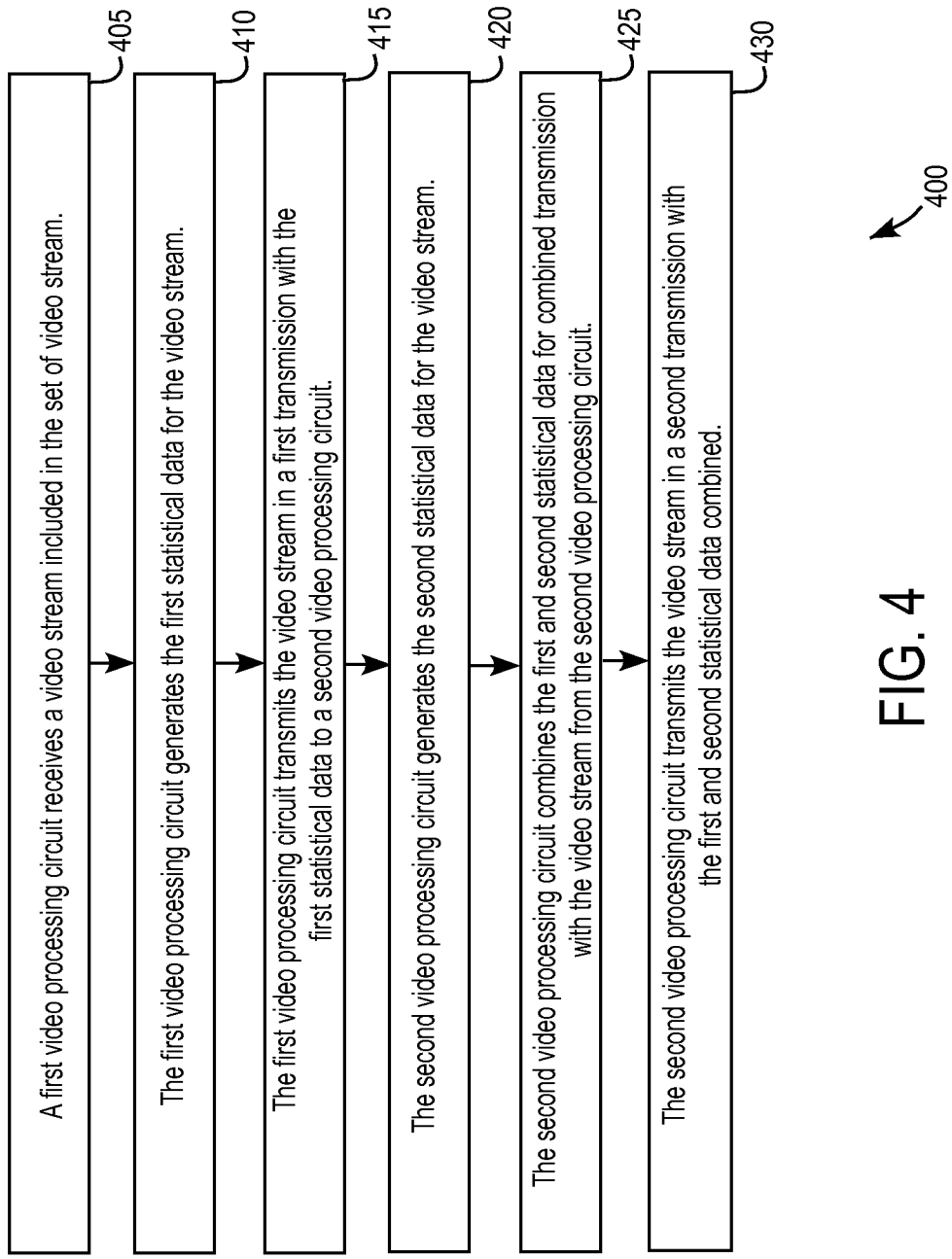
FIG. 4 depicts a high-level flow diagram of a video processing method according to another embodiment.

FIG. 4 depicts a high-level flow diagram of a video processing method 400 according to another embodiment. The high-level flow diagram represents one example embodiment and those of skill in the art will understand that various steps of the high-level flow diagram may be combined and/or added without deviating from the scope and the purview of the embodiment.

At 405, a first video processing device 105 receives a video stream included in the set of video stream 125. First video processing device 105 may be an active video processing device included in the set of active video processing device 110.

At 410, first video processing device 105 generates first statistical data 130 for the video stream.

At 415, first video processing device 105 transmits the video stream in a first transmission with first statistical data 130 to a second video processing device 105. First statistical data 130 may be in band or out of band with respect to the video stream. The first and second video processing devices may be serially configured for serially processing the video stream as shown in FIG. 2.

At 420, second video processing device 105 generates second statistical data 130 for the video stream. Second video processing device 105 may be an active video processing device included in the set of active video processing device 110, and may use the first statistical data 130 to generate the second statistical data 130.

At 425, second video processing device 105 combines the first and the second statistical data 130 for combined transmission with the video stream from the second video processing device.

At 430, second video processing device 105 transmits the video stream in a second transmission with the first and the second statistical data combined. First statistical data 130 may be in band or out of band with respect to the video stream. Video processing devices 105 that are downstream from second video processing device 105 may be relatively simple devices and advantageously use the first and the second statistical data 130 generated upstream for processing the video stream. According to one embodiment, second video processing device at 420 may modify the first statistical data 130 using, for example, the second statistical data 130. Modified first statistical data 130 may be combined with second statistical data 130 for transmission from the second video processing device. According to another embodiment, second video processing device at 420 may remove a portion of first statistical data 130 using, for example, the second statistical data 130. The remaining portion of first statistical data 130 may be combined with second statistical data 130 for transmission from the second video processing device. First and/or second video processing devices 105 may be at a headend or an intermediate node.

Figure 5:
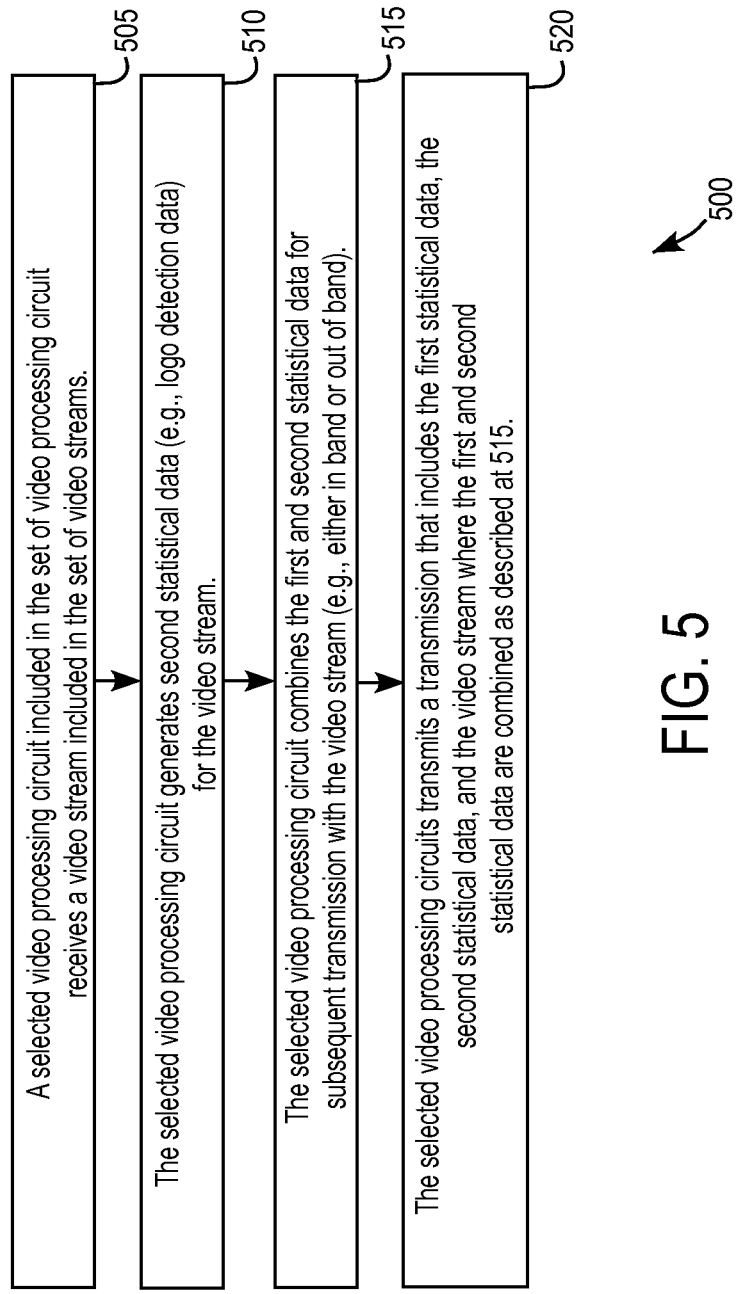
FIG. 5 depicts a high-level flow diagram of a video processing method according to another embodiment.

FIG. 5 depicts a high-level flow diagram 500 of a video processing method according to another embodiment. The high-level flow diagram represents one example embodiment and those of skill in the art will understand that various steps of the high-level flow diagram may be combined and/or added without deviating from the scope and the purview of the embodiment.

At 505, a selected video processing device included in the set of video processing device 105 receives a video stream included in the set of video streams 125. The video stream may include first statistical data 130 (e.g., motion vector mapping data) for the video stream where the first statistical data is generated upstream from the selected video processing device. The selected video processing device may be an active video processing device included in the set of active video processing devices 110.

At 510, the selected video processing device generates second statistical data (e.g., logo detection data) for the video stream.

At 515, the selected video processing device combines the first and the second statistical data for subsequent transmission with the video stream (e.g., either in band or out of band).

At 520, the selected video processing devices transmits a transmission that includes the first statistical data, the second statistical data, and the video stream where the first and the second statistical data are combined as described at 515.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations, and equivalents may be employed without departing from the scope of the invention as defined by the claims.

What is claimed is:

1. A method for processing a video stream comprising:
    receiving a first copy of the video stream and a second copy of the video stream by a first hardware encoder and a second hardware encoder, respectively;

processing the first copy of the video stream and the second copy of the video stream to generate first statistical data and second statistical data for the video stream using the first hardware encoder and the second hardware encoder, respectively, wherein at least one of the first statistical data and the second statistical data includes information indicating content detected in the video stream;

transmitting, in a first transmission by the first hardware encoder, the first copy of the video stream with the first statistical data;

transmitting, in a second transmission by the second hardware encoder, the second statistical data;

receiving the first copy of the video stream with the first statistical data from the first transmission by the first hardware encoder and the second statistical data from the second transmission by the second hardware encoder by a third hardware encoder;

in response to receiving the first copy of the video stream with the first statistical data from the first hardware encoder and the second statistical data from the second hardware encoder, generating, using the third hardware encoder, third statistical data for the video stream using at least one of the first statistical data and the second statistical data;

combining the first statistical data, the second statistical data, and the third statistical data with the first copy of the video stream to produce a third video stream, wherein the first statistical data, the second statistical data, and the third statistical data are included in one or more in-band portions of the third video stream; and transmitting the third video stream.

2. The method of claim 1, further comprising:
inserting the first statistical data into an in-band portion of the first copy of the video stream by the first hardware encoder or into an out of band region for the first copy of the video stream; and inserting the second statistical data into an in-band portion of the second copy of the video stream by the second hardware encoder or into an out of band region for the second copy of the video stream.

3. The method of claim 2, wherein reading the first and the second statistical data from the first and the second transmissions includes:
reading the first statistical data from the in-band portion of the first copy of the video stream or from the out of band region for the first copy of the video stream, and reading the second statistical data from the in-band portion of the second copy of the video stream or from the out of band region for the second copy of the video stream.

4. The method of claim 1, further comprising using the first statistical data or the second statistical data to process the one copy of the video stream.

5. The method of claim 1, further comprising determining whether to use the first statistical data or the second statistical data to process the one copy of the video stream based on the first statistical data and the second statistical data.

6. The method of claim 1 further comprising modifying the first statistical data or the second statistical data with the third statistical data.

7. The method of claim 6, wherein transmitting the third video stream includes transmitting the third video stream with the first statistical data or the second statistical data modified.

8. The method of claim 6, wherein:
the first hardware encoder and the second hardware encoder process the first copy of the video stream and the second copy of the video stream in parallel, generating the first statistical data and the second statistical data includes generating the first statistical data and the second statistical data in parallel by the first hardware encoder and the second hardware encoder, respectively, and transmitting the first transmission and the second transmission includes transmitting the first transmission and the second transmission in parallel.

9. A video processing device for processing video streams comprising:
a video processing device, having a hardware encoder, configured to:
receive, from a first hardware encoder, a first copy of a video stream with first statistical data for the video stream, wherein the first copy of the video stream was processed by the first hardware encoder to generate the first statistical data;

receive, from a second hardware encoder, second statistical data for the video stream, wherein a second copy of the video stream was processed by the second hardware encoder to generate the second statistical data, and wherein at least one of the first statistical data and the second statistical data includes information indicating content detected in the video stream;

in response to receiving the first copy of the video stream with the first statistical data from the first hardware encoder and the second statistical data from the second hardware encoder, generate third statistical data for the video stream using the hardware encoder using at least one of the first statistical data and the second statistical data;

combine the first statistical data, second statistical data, and the third statistical data with a copy of the first copy of the video stream to produce a third video stream, wherein the first statistical data, the second statistical data, and the third statistical data are included in one or more in-band portions of the third video stream; and transmit, in a transmission, the third video stream.

* * * * *